United States Patent [19]

Kanke et al.

[11] Patent Number: 5,098,126
[45] Date of Patent: Mar. 24, 1992

[54] JACK MOUNTING ARRANGEMENT FOR AUTOMOTIVE VEHICLE

[75] Inventors: Yoshio Kanke; Yukihide Oishi, both of Atsugi, Japan

[73] Assignee: Nissan Motor Company, Ltd., Yokohama, Japan

[21] Appl. No.: 420,438

[22] Filed: Oct. 12, 1989

[30] Foreign Application Priority Data

Oct. 14, 1988 [JP] Japan .................... 63-134229

[51] Int. Cl.[5] ............................. B60R 11/06
[52] U.S. Cl. ...................... 280/763.1; 248/503
[58] Field of Search ........... 280/763.1; 296/30, 37.1; 180/68.5; 248/300, 500, 503

[56] References Cited

U.S. PATENT DOCUMENTS

| | | | |
|---|---|---|---|
| 1,554,300 | 9/1925 | Sellers | 180/68.5 |
| 1,572,851 | 2/1926 | Spreen | 180/68.5 |

FOREIGN PATENT DOCUMENTS 59-66650 5/1984 Japan .

Primary Examiner—Andres Kashnikow
Assistant Examiner—Michael Mar
Attorney, Agent, or Firm—Pennie & Edmonds

[57] ABSTRACT

A jack bracket is installed so as to have an opening on an inboard side thereof. A reinforcement bracket connects an outboard side of the jack bracket to a beaded portion of a rear fender and a bumper side. A wheel house outer has an extension interconnecting a rear end portion of a rear pillar inner and a lateral flange of a rear floor. The jack bracket is installed on the jack bracket mounting plate which is in turn installed on the rear end portion of the rear pillar inner and the extension of the wheel house outer. A floor extension plate interconnects the jack bracket mounting plate and the lateral flange of the rear floor.

1 Claim, 3 Drawing Sheets

FIG.5
(PRIOR ART)
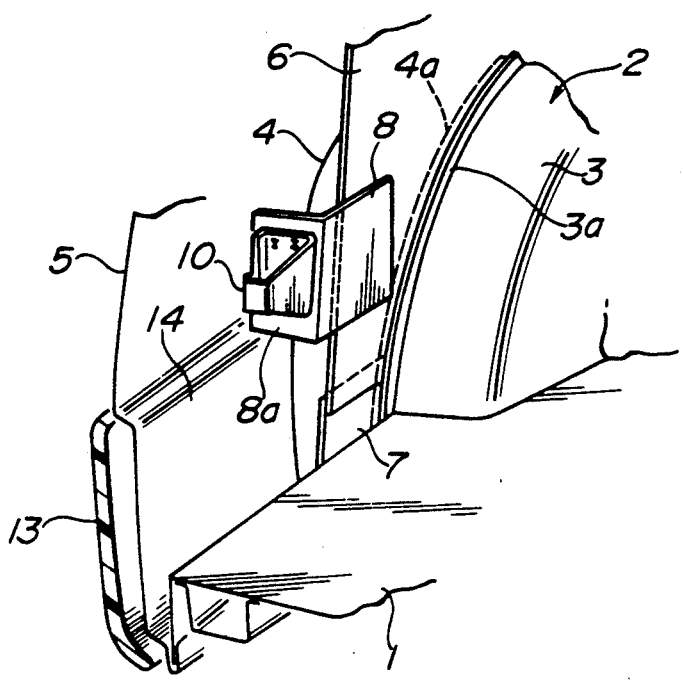
FIG.6
(PRIOR ART)
FIG.7
(PRIOR ART)
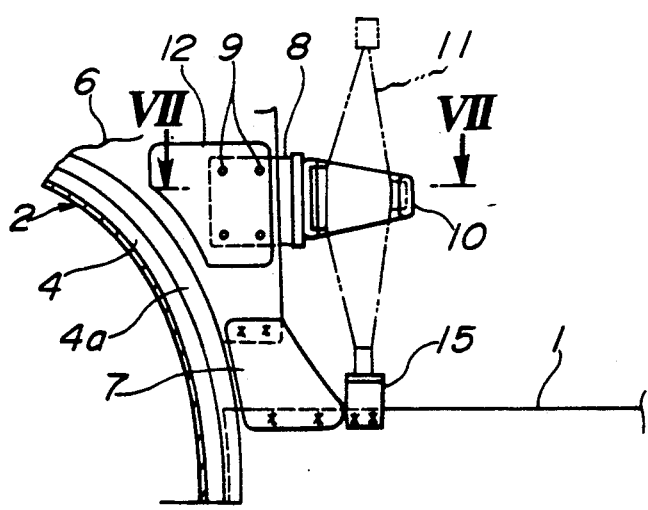

JACK MOUNTING ARRANGEMENT FOR AUTOMOTIVE VEHICLE

BACKGROUND OF THE INVENTION

1. Field of the Invention

The present invention relates in general to vehicle body constructions and more particularly to a jack mounting arrangement for an automotive vehicle.

2. Description of the Prior Art

An example of a prior art jack mounting arrangement for an automotive vehicle is disclosed in Japanese Utility Model Provisional Publication No. 59-66650 and also shown in FIGS. 5 to 7.

In the figures, 1 is a luggage compartment floor or rear floor and 2 is a rear wheel house consisting of a wheel house inner 3 affixed to the rear floor 1 and a wheel house outer 4 affixed to a rear fender 5. A rear pillar inner 6 is affixed to the joining portions of the wheel house inner 3 and wheel house outer 4, i.e., sandwiched between the peripheral flanges 3a and 4a of the wheel house inner 3 and wheel house outer 4 and affixed to same. A floor extension plate 7 is disposed at the rear of the wheel house 2 and at a lateral end of the rear floor 1 to interconnect a lateral flange 1a of the rear floor 1 and a rear end portion of the rear pillar inner 6. A jack bracket mounting plate 8 is secured with bolts and nuts 9 to the rear end portion of the rear pillar inner 6. Affixed to a mounting portion 8a of the jack bracket mounting plate 8 is a channel-like or C-like jack bracket 10 which is disposed so as to have an opening on the outboard side thereof and adapted to partly surround a jack 11 and hold it. Affixed to the rear pillar inner 6 on the side opposite to the side on which the jack bracket mounting plate 8 is installed is a reinforcement 12 of a predetermined size. In FIG. 5, 13 is a bumper side (i.e., a lateral end portion of a rear bumper), 14 is a beaded portion of the rear fender 5 to receive the bumper side 13.

In the above arrangement, while the reinforcement 12 is affixed to the rear pillar inner 6 to reinforce the portion on which the jack bracket mounting plate 8 is installed, the jack bracket mounting plate 8 is adapted to protrude from the rear pillar inner 6 to support the jack bracket 11 which in turn supports the jack 11 of a relatively large weight. For this reason, the load of the jack 11 is sustained mainly by the rear pillar inner 6, thus causing the portion of the rear pillar inner 6 on which the jack bracket mounting plate 8 is installed to be liable to move to and fro laterally of the vehicle body, i.e., in the vehicle width directions.

Such movements subject the joining portions of the rear pillar inner 6 and floor extension plate 7 to loads opposed in the vehicle width directions and making same liable to be broken.

To prevent such movements of the rear pillar inner 6, a secondary jack bracket 15, as shown in FIG. 6, is disposed at a lateral end of the rear floor 1 to support the lower end of the jack 11 so that the lower end of the jack 11 is held stationary relative to the vehicle body. However, since the distance between the secondary jack bracket 15 and main jack bracket 10 is relatively long, such a secondary jack bracket 15 cannot effectively prevent the above described movements of the rear pillar inner 6.

SUMMARY OF THE INVENTION

In accordance with the present invention, there is provided an improved jack mounting arrangement for an automotive vehicle which comprises a rear floor having a lateral flange at the rear of a wheel house, a rear pillar inner having a rear end portion above the lateral flange, a jack bracket mounting plate secured to the rear end portion of the rear pillar inner, a jack bracket secured to the jack bracket mounting plate, a bumper side, a rear fender having a portion matched with the bumper side and reinforcement means for connecting the jack bracket to the above described portion of the rear fender and the bumper side.

The above arrangement is effective for solving the above noted problem inherent in the prior art device.

It is accordingly an object of the present invention to provide a jack mounting arrangement for an automotive vehicle which can efficiently increase the rigidity of a jack support without substantially increasing the number of constituent parts.

It is another object of the present invention to provide a jack mounting arrangement of the above described character which can assuredly prevent lateral movement of a jack bracket together with a rear pillar inner relative to adjacent parts of a vehicle body and is therefore assuredly prevented from being damaged or broken by laterally opposite loads applied thereto from the jack.

It is a further object of the present invention to provide a jack mounting arrangement of the above described character which can efficiently increase the rigidity in support of a bumper side.

BRIEF DESCRIPTION OF THE DRAWINGS

FIG. 5 is a prior art jack mounting arrangement;

FIG. 6 is a side view of the jack mounting arrangement of FIG. 5; and

FIG. 7 is a sectional view taken along the line VII—VII of FIG. 6.

DESCRIPTION OF THE PREFERRED EMBODIMENT

Figure 1:
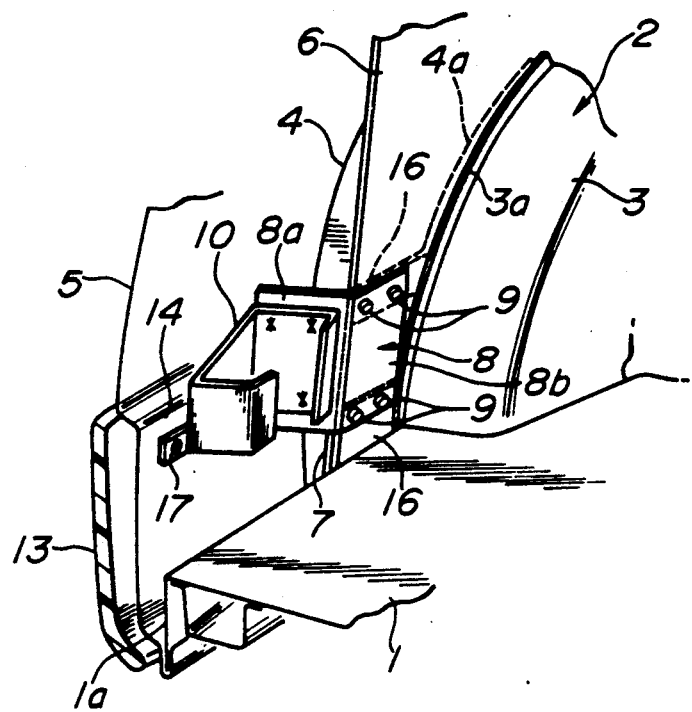
FIG. 1 is a perspective view of a jack mounting arrangement for an automotive vehicle according to an embodiment of the present invention.
Figure 2:
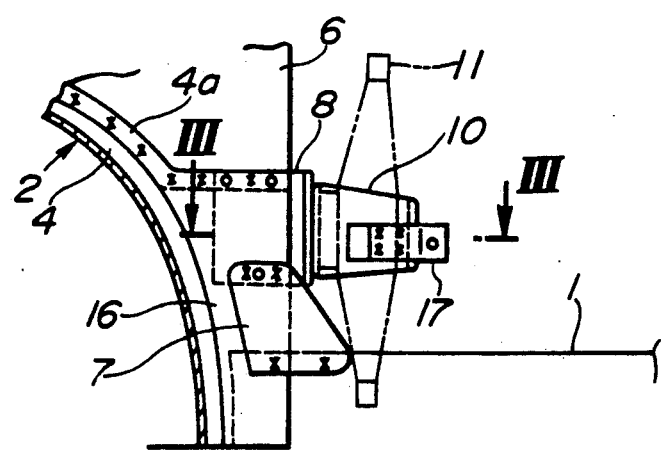
FIG. 2 is a side elevational view of the jack mounting arrangement of FIG. 1.
Figure 3:
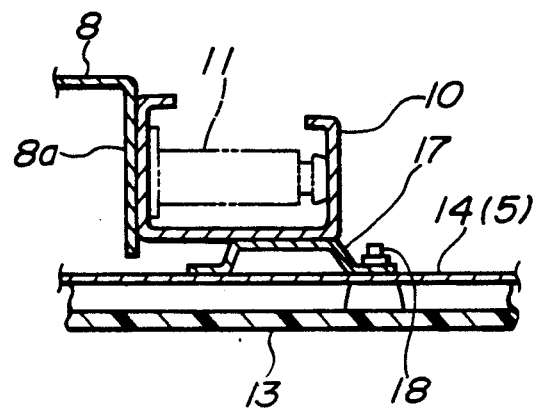
FIG. 3 is a sectional view taken along the line III—III of FIG. 2.
Figure 4:
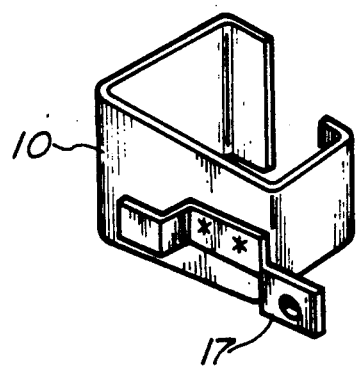
FIG. 4 is a perspective view of a jack bracket employed in the jack mounting arrangement of FIG. 1.

Referring to FIGS. 1 to 4, in which parts and portions like or corresponding to those of the prior art arrangement are designated by the same reference characters, a rear pillar inner 6 has a lower end portion sandwiched between a peripheral flange 3a of a wheel house inner 3 and a peripheral flange 4a of a wheel house outer 4 and spot-welded or otherwise secured to same similarly to the prior art arrangement. The wheel house outer 4 is formed with an extension 16 extending rearwardly from a rearward part of the peripheral flange 4a and elongated as far as the rear edge of the rear pillar inner 6. The extension 16 also extends between the rear pillar inner 6 and a lateral flange 1a of a rear floor 1 to interconnect the same. That is, the extension 16 is spot-welded or otherwise secured at its upper end portion to a rear lower end portion of the rear pillar inner 6 and at its lower end portion to the lateral flange 1a of the rear floor 1. A floor extension plate 7 is spot-welded or otherwise secured to the extension 16 of the wheel house outer 4 and the lateral flange 1a of the rear floor 1 and adapted to interconnect a jack bracket mounting plate 8 and the lateral flange 1a of the rear floor 1 when the jack mounting plate 8 is installed in place. That is, the floor extension plate 7 is spot-wedled or otherwise secured at its upper end portion to a portion of the extension 16 to which the lower end portion of the jack bracket mounting plate 8 is bolted or otherwise secured. The floor extension plate 7 is spot-welded or otherwise secured at the lower end portion to both of the extension 16 and the lateral flange 1a of the rear floor 1.

The jack bracket mounting plate 8 is of an L-like shape and has a mounted portion or mounted arm 8b secured to the rear pillar inner 6 and a mounting portion or mounting arm 8a extending laterally outwards from the mounted arm 8b for support of a jack bracket 10 of a channel-like or C-like shape. More specifically, the mounted arm 8b of the jack bracket mounting plate 8, in this embodiment, is secured at its upper end portion to the rear pillar inner 6 and the extension 16 of the wheel house outer 4 with bolts and nuts 9 in such a way that the rear pillar inner 6 is interposed between the upper end portions of the mounted arm 8b and extension 16. The mounted arm 8b of the jack bracket mounting plate 8 is also secured at its lower end portion to the extension 16 of the rear wheel house outer 4 and floor extension plate 7 with bolts and nuts 9 in such a way that the extension 16 is interposed between the lower end portion of the mounted arm 8b and the upper end portion of the floor extension plate 7.

The jack bracket 10 is spot-welded or otherwise secured to the mounting arm 8a of the jack bracket mounting plate 8 in such a way as to have an opening on the inboard side thereof and adapted so that a jack 11 is clamped or held fixed between the opposite walls of the jack bracket 10. The jack bracket 10 has secured thereto on its outboard side a secondary bracket 17 in contact with the inboard side of a beaded portion 14 of a rear fender 5 for receiving therein a bumper side 13. The secondary bracket or reinforcement bracket 17 is secured with a bolt and nut 18 to the bumper side 13 in such a way that the beaded portion 14 of the rear fender 5 is interposed between the reinforcement bracket 17 and bumper side 13. The reinforcement bracket 17, as best seen from FIGS. 3 and 4, has at its longitudinally opposite ends two legs in contact with the beaded portion 14 of the rear fender 5.

From the foregoing, it will be understood that the jack mounting arrangement of this invention can increase the rigidity in support of the jack 11 considerably since with the arrangement of this invention the load of the jack 11 is sustained distributively by the vehicle body. That is, the load of the jack 11 is loaded on the lateral end portion 1a of the rear floor 1, not only through the rear pillar inner 6, but through the floor extension plate 7 and the extension 16 of the wheel house outer 4 in addition to the rear pillar inner 6. In this connection, it is to be noted that the lateral flange 1a of the rear floor 1 is adapted to constitute a rigid structural member. The weight of the jack 11 is further loaded on the wheel house outer 4 through the extension 16 and on the beaded portion 14 of the rear fender 5 through the secondary bracket 17. In this instance, it is to be noted the jack bracket 10 is supported at its horizontally opposite portions by the rigid vehicle body portions such that the secondary bracket 17 secured to the beaded portion 14 of the rear fender 5 and the bumper side 13 is effective for preventing or at least reducing movement of the rear pillar inner 6 laterally of the vehicle body.

It is further to be understood that the bumper side 13 is supported on the rigid lateral end portion 1a of the rear floor 1 by way of the seconary bracket 17, jack bracket 10, etc., thus making it possible to increase the rigidity in support of the bumper side 13.

What is claimed is:

1. A jack mounting arrangement for an automotive vehicle comprising:

a wheel house having a wheel house inner and a wheel house outer;

a rear pillar inner having a lower end portion secured to said wheel house inner and wheel house outer;

a rear floor having a lateral flange at the rear of said wheel house, wherein said rear pillar inner has a rear end portion above said lateral flange of said rear floor; and wherein said wheel house outer has a wheel house extension plate attached thereto, said wheel house extension plate extending between said rear end portion of said rear pillar inner and said lateral flange of said rear floor to interconnect the same;

a jack bracket mounting plate of an L-like shape, having a first arm secured to said rear end portion of said rear pillar inner and said wheel house extension plate and a second arm extending laterally outwards from said first arm;

a jack bracket having a pair of L-shaped arms joined by an I-shaped arm to form a C-like shape, with an opening bounded by free ends of said L-shaped arms, secured to said second arm of said jack bracket mounting plate so that said opening faces laterally away from said wheel house extension plate;

a floor extension plate secured at an upper end portion to said wheel house extension plate and said first arm of said jack bracket mounting plate and at a lower end portion to said wheel house extension plate and said lateral flange of said rear floor;

a bumper side;

a rear fender having a beaded portion for receiving therein said bumper side; and a reinforcement bracket having opposite end portions in contact with said beaded portion of said rear fender and an intermediate portion formed between said opposite end portions and secured to a portion of said jack bracket, one of said opposite end portions of said reinforcement bracket being secured to said bumper side and said beaded portion of said rear fender.

* * * * *